US007997184B2

(12) United States Patent
Hansen

(10) Patent No.: US 7,997,184 B2
(45) **Date of Patent: *Aug. 16, 2011**

(54) SELF STARTING VIBRATOR

(75) Inventor: Robert Hansen, Oakdale, MN (US)

(73) Assignee: Dynamic Air, St. Paul, MN (US)

(*) Notice: Subject to any disclaimer, the term of this patent is extended or adjusted under 35 U.S.C. 154(b) by 114 days.

This patent is subject to a terminal disclaimer.

(21) Appl. No.: 12/322,661

(22) Filed: Feb. 5, 2009

(65) Prior Publication Data

US 2009/0139394 A1 Jun. 4, 2009

Related U.S. Application Data

(63) Continuation of application No. 11/637,487, filed on Dec. 12, 2006, now Pat. No. 7,530,301.

(51) Int. Cl.
*B03C 3/34* (2006.01)
*G01M 7/04* (2006.01)

(52) U.S. Cl. .......... 91/234; 73/665

(58) Field of Classification Search .......... 91/232, 91/233, 234; 73/665

See application file for complete search history.

(56) References Cited

U.S. PATENT DOCUMENTS

| | | | | |
|---|---|---|---|---|
| 2,590,155 | A * | 3/1952 | Cannon | 91/234 |
| 3,570,628 | A * | 3/1971 | Rodgers | 184/24 |
| 4,402,255 | A * | 9/1983 | Fink et al. | 91/234 |
| 5,209,564 | A * | 5/1993 | Manci et al. | 91/234 |
| 5,493,944 | A * | 2/1996 | Felkins et al. | 91/234 |
| 5,904,332 | A * | 5/1999 | Lindbeck | 248/560 |
| 6,044,709 | A * | 4/2000 | Briggs et al. | 73/665 |
| 7,530,301 | B2 * | 5/2009 | Hansen | 91/234 |

* cited by examiner

*Primary Examiner* — Thomas E Lazo
(74) *Attorney, Agent, or Firm* — Jacobson & Johnson LLC

(57) ABSTRACT

Briefly, the invention comprises a vibrator with an on-demand start-up system, that inhibits fouling the atmosphere, with one embodiment of the invention including an integral non-fouling start-up system wherein at least one of the bearing surfaces contains a surface adhered lubricant so as to provide an on-demand static start-up system and in another embodiment the on-demand start-up system is a dynamic system that can unbalance the differential forces on the piston therein to ensure that the vibrator will begin vibrating "on-demand". Thus, two types of start-up systems are available one an on-demand static start-up system and the other an on-demand dynamic start-up system with either of the systems can be used alone or if desired in combination to provide redundant start-up systems.

14 Claims, 3 Drawing Sheets

SELF STARTING VIBRATOR

CROSS REFERENCE TO RELATED APPLICATIONS

This is a continuation application of U.S. patent application Ser. No. 11/637,487 now U.S. Pat. No. 7,530,301 entitled SELF STARTING VIBRATOR filed Dec. 12, 2006.

FIELD OF THE INVENTION

This invention relates generally to vibrators and, more specifically, to non-impacting vibrators with integral on-demand start-up systems and conveying systems with a vibrator externally secured to a conveying line to dislodge materials should the materials become lodged therein.

STATEMENT REGARDING FEDERALLY SPONSORED RESEARCH OR DEVELOPMENT

None

REFERENCE TO A MICROFICHE APPENDIX

None

BACKGROUND OF THE INVENTION

The concept of non-impacting linear vibrators is known in the art, typically, a cylindrical mass oscillates back and forth in a cylindrical chamber as air flows into and out of the cylindrical chamber. The vibrators are generally lubrication free since air is used to support the cylindrical mass as it oscillates back and forth. If lubricants such as oils or the like are used it results in an oil mist being discharged into the atmosphere. While such systems provide vibration one of the difficulties with such systems is that the vibrators do not always start on-demand. That is, as air or other fluid is introduced into the cylindrical chamber the air might pass around the cylindrical mass without inducing the required oscillation of the mass therein.

In one embodiment of the known linear vibrators the vibrator includes a cylindrical shaped piston that is driven back and forth in a chamber by air that simultaneously pushes the piston back and forth as it forms an air bearing around the piston to provide essentially a frictionless surface between the piston and the housing. One of the drawbacks of such vibrators is that to ensure that the vibrator responds to the introduction of the fluid into the housing it is usually necessary to have some mechanical means such as a spring to bias the piston to facilitate initiation of the oscillating activity of the piston. That is, when fluid such as air is introduced into the chamber the piston, which is to be supported by an air bearing, might not immediately begin oscillating when air is introduced into the chamber. Consequently, if one wants to ensure start-up one needs to initiate the oscillating action of the piston through incorporating a mechanical device such as a spring or the like in the vibrator. However, introducing mechanical start-up devices such as springs reduces the life of the vibrator since the springs eventuality break through metal fatigue.

The present invention in one embodiment provides an on-demand linear vibrator with immediate start-up that avoids the problems of lubrication contamination as well as the problem of breakdown due to fatigue of a start-up mechanism. In another embodiment the on-demand linear vibrator with immediate start-up includes redundant on-demand start-up systems.

SUMMARY OF THE INVENTION

Briefly, the invention comprises a housing having an internal cylindrical bearing surface forming a chamber therein and a fluid inlet to direct a fluid into the chamber. A one piece piston is slideable located therein with the piston having a set of internal fluid passages therein and an external bearing surface located thereon. Air flowing between the internal cylindrical bearing surface of the housing and the external bearing surface of the piston create essentially a frictionless fluid bearing that permits the piston to slide back and forth in the chamber with very little loss in energy and virtually no wear on the internal cylindrical bearing surface of the housing or the external bearing surface of the piston. To provide on-demand start-up, without fouling the atmosphere, one embodiment of the invention includes an internal non-fouling start-up system wherein at least one of the bearing surfaces contains a surface adhered lubricant so as to provide an on-demand static start-up system while at the same time inhibiting or eliminating fouling the atmosphere. In another embodiment the on-demand start-up system is a pollution free dynamic system including a chamber port that can unbalance the differential forces on the piston therein to ensure that the vibrator will begin vibrating on-demand. Thus, two start-up systems are available one an on-demand static start-up system and the other an on-demand dynamic start-up system. While either of the systems can be used alone or, if desired, in combination to provide a redundant system.

DESCRIPTION OF THE PREFERRED EMBODIMENT

Figure 1A:
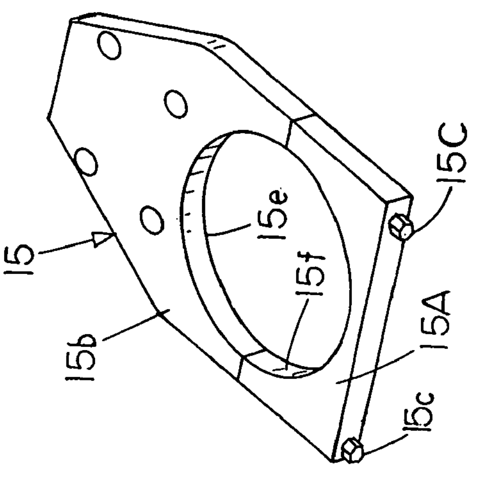
FIG. 1A is an isolated view of a mounting bracket for holding the vibrator on a conveying conduit.
Figure 1:
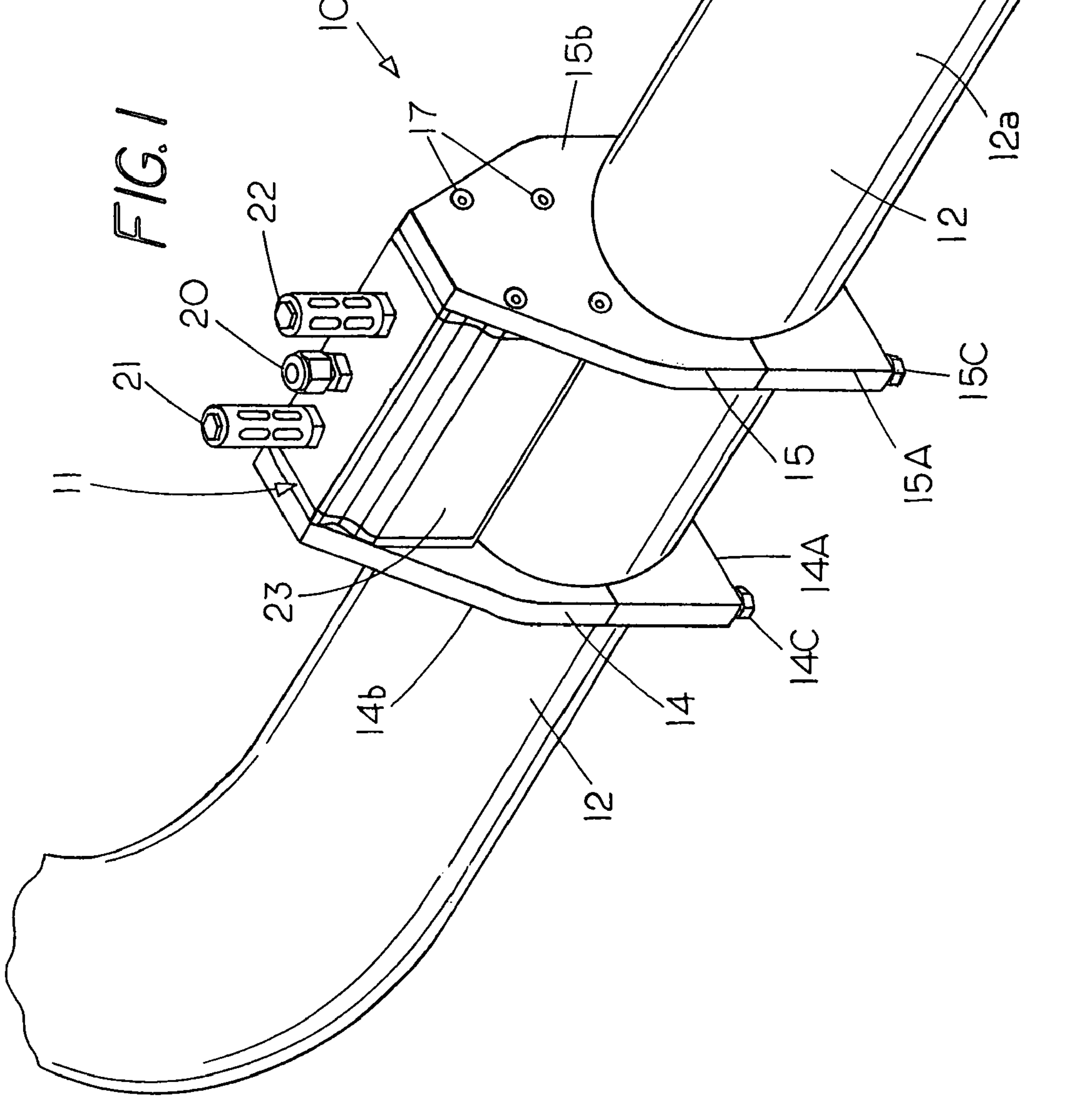
FIG. 1 is a perspective view of the non-impacting vibrator mounted on a conveying line.

FIG. 1 is a perspective view of a conveying system 10 with a vibrator 11 secured thereto. The system includes a pneumatic conveying conduit 12 with a non-impacting vibrator 11 secured thereto by a first end mounting plate 14 having a top member 14_b_ secured to one end of vibrator 11 by bolts (not shown) and a curved end extending partially around the outer surface of conduit 12 and into contact with the conduit 12. A bottom member 14_a_ of mounting plate 14 is secured to top member 14_b_ by bolts 14_c_. Similarly, a second end mounting plate 15 having a top member 15*b* is secured to the opposite end of vibrator 11 by bolts 17 and a curved end extending partially around the outer surface of conduit 12 and into contact with conduit 12. A bottom member 15*a* of mounting plate 15 is secured to top member 15*b* by bolts 15*c* located on opposite sides of the mounting plate 15 to thereby clamp the conduit 12 therein. End mounting plates 14 and 15 are identical to each other and can be clamped tightly around the external surface of rigid conduit 12 to enable the vibratory action of the vibrator 11 to transfer vibration energy to conduit 12 to dislodge any material that becomes stuck within the conveying conduit 12. Typically, the vibrator is placed at a curve of the conduit since material can more frequently lodge where the conveying conduit changes directions although the vibratory can be placed in other areas where lodging can occur.

The mounting plate 15, which clamps to the conveying conduit 12, is shown in isolated perspective view in FIG. 1A to reveal the top member 15*b* having a semi-cylindrical surface 15*e* and the bottom member 15*a* having a semi-cylindrical surface 15*f* for mating and forming clamping engagement with the outer peripheral surface 12*a* of the pneumatic conduit 12 so that vibrations from the vibrator 11 are transmitted to the conveying conduit 12 to thereby dislodge material therein.

FIG. 1 shows that the vibrator 11 includes a housing 23 having a fluid inlet 20 and a first discharge vent valve 21 and a second discharge vent valve 22 that allow fluid to escape from within the vibrator 11. In operation fluid inlet 20 is connected to a source of high pressure fluid such as compressed air, which flows into fluid inlet 20 and is alternately discharged through vent valve 21 and vent valve 22.

Figure 2:
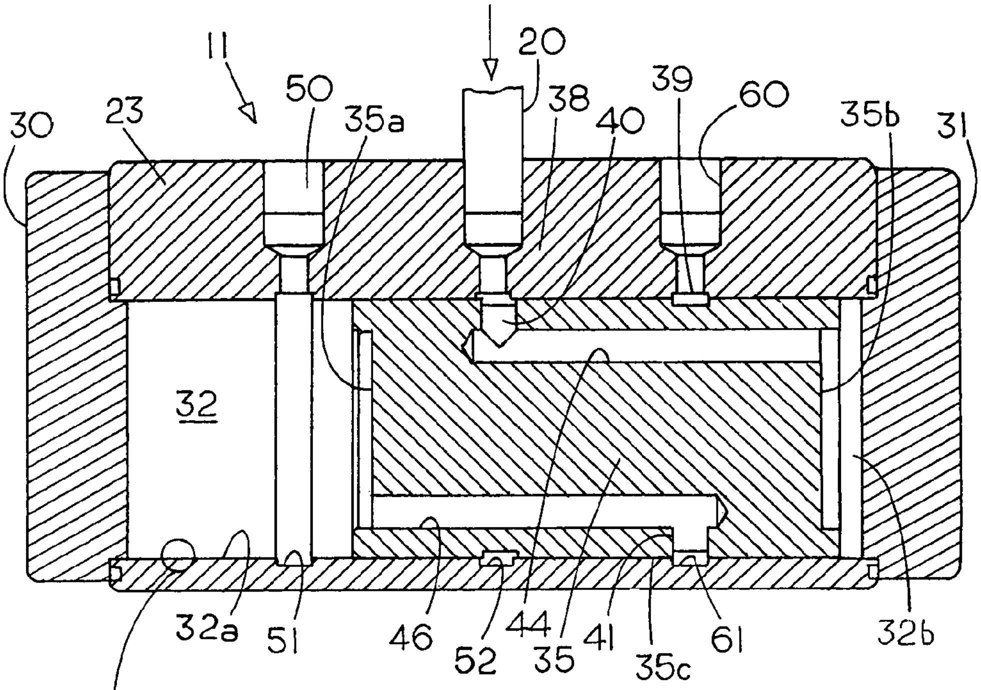
FIG. 2 is a section view of a non-impacting vibrator with a cylindrical mass therein in a first position.
Figure 6:
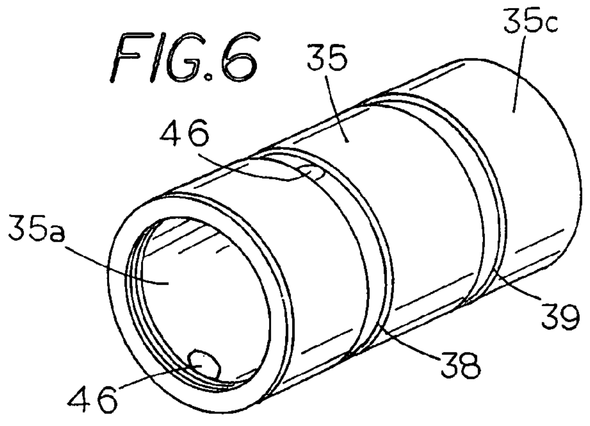
FIG. 6 is a perspective view of the slideable piston in the vibrator.

Referring to FIG. 2 vibrator 11 is shown in a cross sectional view revealing vibrator end plates 30 and 31 that are secured to cylindrical housing 23 by bolts (not shown) so that the end plates and the housing form an elongated cylindrical chamber having an elongated cylindrical bearing surface 32*a* for a one-piece piston 35 to oscillate back and forth therein. Piston 35 is shown in section in FIG. 2 and in isolated perspective in FIG. 6 and includes a first circumferential groove 38 that allows fluid to flow therearound and enter a radial port 40 which connects to an axially extending internal port 44 that terminates in the right end of piston 35. Piston 40 includes a second circumferential groove 39 that allows fluid to flow there around and enter a radial port 41 (FIG. 2) which connects to an axially extending port 46 that terminates in the opposite end 35*a* of piston 35.

Thus housing 23 includes a set of three circumferential grooves forming annular chambers. A first circumferential groove 51 connects to vent port 50, a second circumferential groove 52 that connects to inlet port 20 and a third circumferential groove 61 that connects to outlet port 60. In addition, there is sufficient clearance to form an annular gap between the external diameter of piston 35 and the internal diameter of cylindrical surface 23*a* to allow a portion of the fluid to flow through the gap to form a fluid bearing therebetween. The fluid bearing enables piston 35 to slide relatively frictionless back and forth. The further portion of the fluid from inlet 20 flows through piston 35 before being discharged though either the outlet port 50 or the outlet port 60.

While the fluid bearing created by the flow of air into the vibrator port 20 provides for relatively frictionless oscillation of the piston 35 it does not always provide on-demand start-up of the vibrator 11. Once the piston 35 is oscillating the dynamic forces continue the oscillations, however, sometimes at start-up adhesion forces between the piston 35 and the housing 23 can cause the piston to stick or not begin oscillating when air is introduce into inlet port 20. It has been found that the use of the adhered lubricant on the interior surface of the housing allows the piston to overcome the static adhesion forces between the piston 35 and the housing 23 to allow the piston to begin oscillating on-demand when fluid such as air is introduce into the vibrator inlet 20 thereby eliminating the need for mechanical start-up systems such as springs or the like.

Figure 2A:
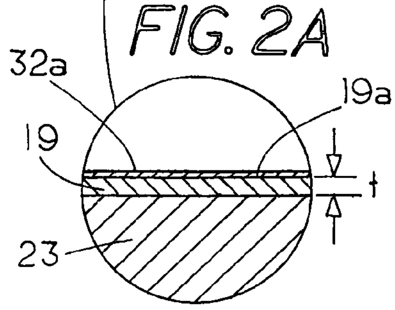
FIG. 2A shows an isolated exploded view of the interior housing surfaced and a coating on the interior surface of the housing.

The embodiment shown in FIG. 2, includes an integral, static, on-demand start-up system. FIG. 2A shows the interior bearing surface 32*a* includes an anodized layer 19 for wear resistance with an adhered lubricant such as a polytetrafluoroethylene 19*a* impregnated therein. By adhered lubricant it is meant a lubricant that tenaciously adheres to anodized layer 19 or is impregnated in the anodized layer 19 to remain thereon so as to inhibit lubricant release and thereby inhibit contamination or fouling of the atmosphere while at the same time allowing vibrator 11 to start on-demand (i.e. when fluid is introduced into the inlet port 20).

Thus, the adhered lubricant 19*a* of the present invention differs from liquid lubricants such as oils and the like, which can contaminate the atmosphere through liquid separation or thorough misting of the oil, since the lubricant remains within the vibrator 11. One such method of providing a housing with an adhered lubricant comprises using an aluminum or aluminum alloy housing and hardening a surface of the aluminum or aluminum alloy housing through a process of hardcoating that involves oxidizing an outer layer of the aluminum or aluminum alloy housing.

Aluminum anodizing is known in the art and comprises an electrochemical process wherein an outer layer of the aluminum or aluminum alloy is converted to a layer of aluminum oxide to produce a wear resistant surface coating. After hardcoating the article with aluminum oxide a lubricant is secured thereto. It has been found that a lubricant such as polytetrafluoroethylene works well since the aluminum oxide coating can be impregnated with polytetrafluoroethylene (TEFLON®). The process is commercially known as “Teflon Impregnated Hardcoat” to produce a film of lubricant on or in the anodized aluminum surface which becomes an adhered lubricant since it remains on the alloy housing. FIG. 2A shows an enlarged isolated view of the surface of housing 23 having an anodized layer 19 of thickness t with a Teflon impregnated Hardcoat 19*a* thereon to form a internal cylindrical bearing surface 32*a*.

While the vibrator 11 has been described in use with gas or air other fluids can be used to drive the piston and provide a frictionless fluid bearing between the piston and the cylinder in the housing. However, generally air is the preferred fluid since air can be discharged into the atmosphere while fluids including various gasses may have to be recycled. The vibrator 11 as well as the piston 35 can be scaled up or down to provide the necessary strength of vibrations. To provide sufficient mass in the piston 35 so as to efficiently generate vibrations piston 35 can be made of a metal and in the embodiment shown comprises bronze and the housing aluminum or an aluminum alloy. While the anodizing has been shown on the internal bearing surface of the housing 11 it is envisioned that if the piston were made of aluminum the external piston bearing surface could be anodized and could contain the Teflon impregnated hardcoat thereon. In addition if desired both the bearing surface of the housing and the bearing surface of the piston could be provided with an adhered lubricant such as a Teflon impregnated hardcoat thereon. While an aluminum or aluminum alloy housing is described other types of materials can be used as long as a lubricant can be adhered thereto in a manner that inhibits the release of the lubricant into the atmosphere.

Figure 3:
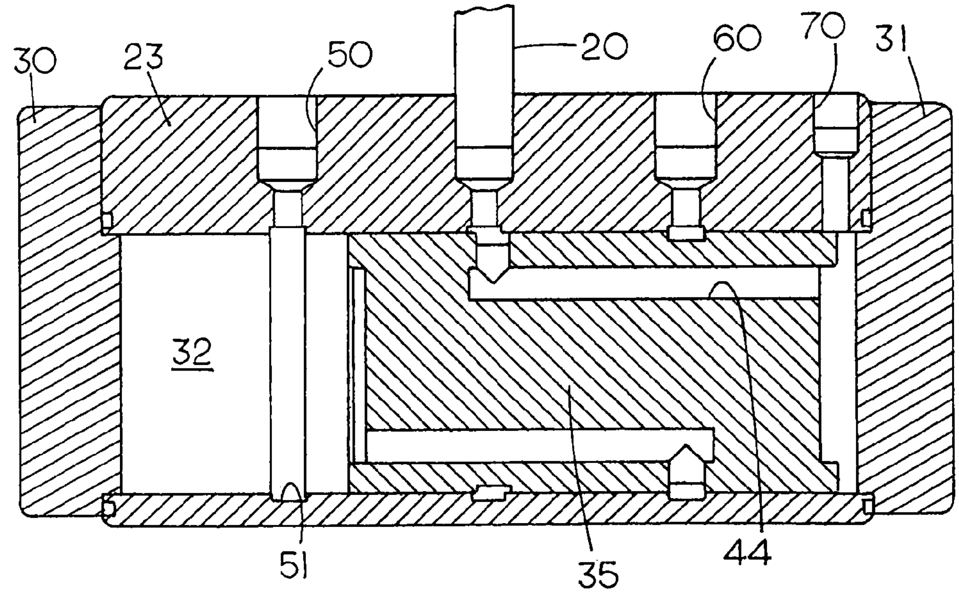
FIG. 3 is a section view of a non-impacting vibrator with a start-up port and the piston in the first position.
Figure 4:
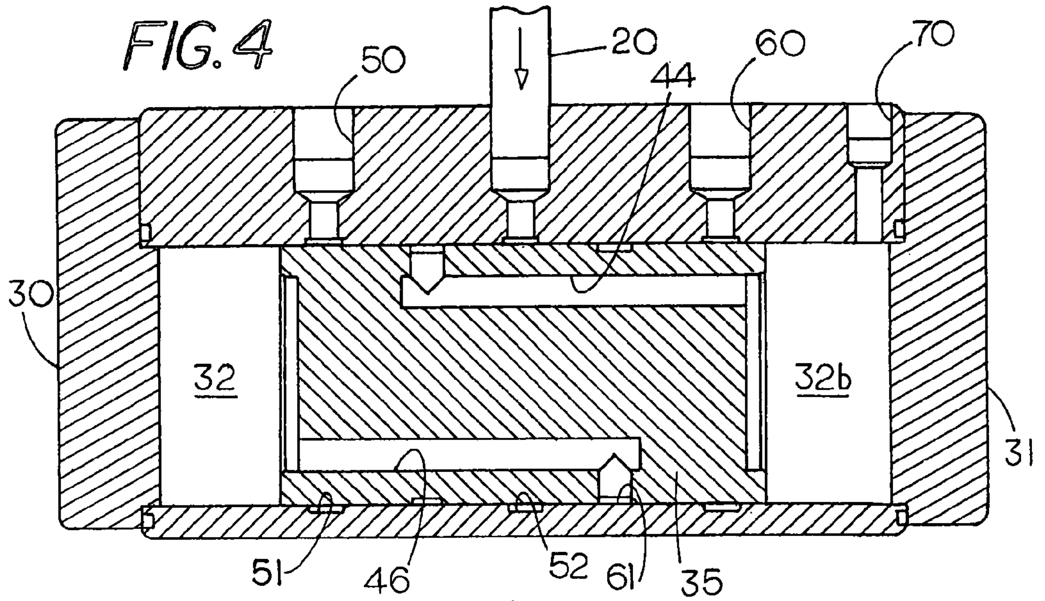
FIG. 4 shows the vibrator of FIG. 3 with the piston in a second position.

To illustrate the operation of the linear vibrator reference should be made to FIGS. 2-4. In operation of the vibrator 11 a fluid such as air is introduced into inlet 20. The air flows into an annular chamber formed by circumferential groove 52 wherein it enters radial port 40 and flows through axial port 44 and into end chamber 32*b* located on the right side of vibrator 11 to increase the pressure in end chamber 32*b*. With air being directed into the end chamber 32*b* through the radial 40 and axial port 44 the opposite occurs in the chamber 32 on the left side of piston 35 which vents to the atmosphere through port 50. As the pressure increases in chamber 32*b* and decreases in chamber 32 it creates a pressure differential across piston 35 that drives the piston 35 to the left. At the same time air flows between piston external bearing surface 35*c* and housing internal bearing surface 32*a* to provide an air bearing. Because of the pressure differential across the piston 35 with the greater pressure in chamber 32*b* the piston 35 begins to move to the left side of chamber 32 (FIG. 4). This has a dual effect, first air is forced out or vented through outlet port 50 as the piston 35 moves toward end plate 30. As piston end 35*a* gets closer to end plate 32 the outlet port 50 is substantially sealed off by piston 35 thereby allowing the pressure to increase in chamber 32 to generate an air cushion sufficient to prevent the piston 35 from contacting end plate 30. In addition, the movement of piston 35 to the left cause the air form inlet port 20 to enter radial port 41 and axial port 46 which increases the pressure in chamber 32. At the same time the chamber 32*b* vents to the atmosphere through port 60 thereby decreasing the pressure therein while the pressure is being increased in chamber 31 thereby generating a differential force across piston 35 to drive the piston 35 toward the opposite end. As a result of the constantly alternating of pressure differential forces across the piston 35 it causes an axial oscillation of piston 35 within housing 23. The result is that the housing 23 vibrates in response to the oscillating mass in the housing 35. Thus, a one-piece piston 35 can oscillate back and forth within a housing to produce the necessary vibration.

Figure 5:
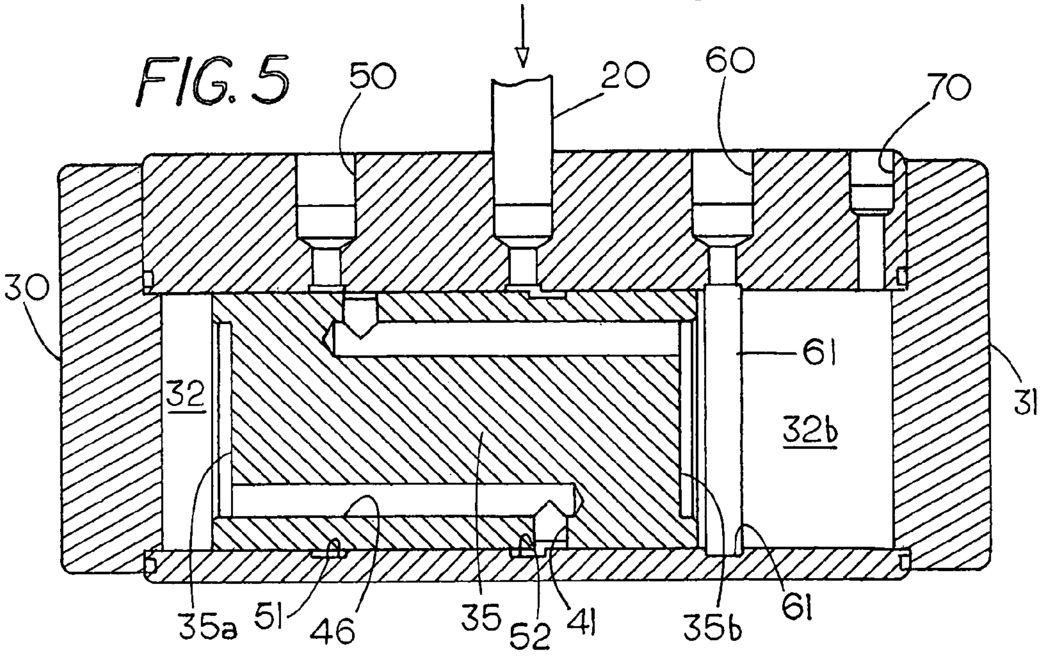
FIG. 5 shows the vibrator of FIG. 3 with the piston in a third position.

Referring to FIG. 3 to FIG. 5 vibrator 11 has been modified to include a dynamic on-demand start-up system. FIGS. 3-5 show the piston 35 in three different positions and a fluid port 70 for biasing the piston 35 during start-up. That is, in some cases one may want to bias the piston 35 to one end or the other of chamber 32 during start-up to ensure that the piston begins oscillating as air is introduced into vibrator 11. The dynamic on-demand system described herein can be used alone or it can be used in conjunction with the static on-demand system that uses an adhered lubricant. Thus if desired, both the static and dynamic on-demand systems can be incorporated into the vibrator thereby providing redundant start-up systems. A useful features for remote applications where human intervention and monitoring is minimal.

In the dynamic on-demand start-up system start-up port 70 can be momentarily connected either to a pressure source to bias piston 35 to the left end of chamber 32 or a vacuum source so that piston 35 can be biased to the right end of chamber 32. The biasing of piston 35 to one end or the other of chamber 32 displaces the piston and ensures that when fluid is introduced into the input port 20 the piston will immediately begin oscillating therein since there is a pressure differential across the piston 35 that will be overcome by the fluid flow from inlet port 20 through the piston 35 and into either chamber 32 or 32*b*. Such a biasing is well suited for those housings wherein no lubricant is applied to either the housing 23 or the piston 35.

In addition, the dynamic on-demand system with a biasing port 70 can also be used as a backup for starting a vibrator with an adhered lubricant thereon thereby providing redundancy to the start-up operation of the vibrator 11.

When oscillation of the piston begins the port 70 is shut off allowing the flow of air within the housing 11 to continue the oscillation.

Figure 7:
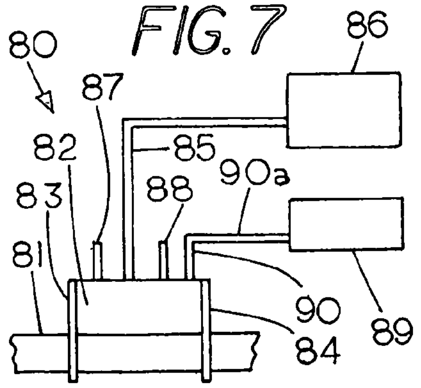
FIG. 7 shows a dislodge system controllable by a source of pressurized air.

FIG. 7 shows a dislodging system 80 with a dynamic on-demand system comprising a conveying conduit 81 having a vibrator 82 secured thereto by end plates 83 and 84. A first source of pressure 86 connects to inlet port 85 for directing a gas such as air into the vibrator 82. Outlet ports 87 and 88 alternately vent gas from the vibrator 82 as the mass therein oscillates back and forth to induce vibration in the conveying tube 81. In the embodiment shown a pressure differential generator 89, which can be either a vacuum source or a pressure source connects to the end port 90 through a fluid line 90*a*. In operation of the dislodging system 80 the operator directs a gas, such as air, from gas source 86 into the vibrator 82 though inlet port 85. To provide for dynamic on-demand start-up of the vibrator 82 the pressure generator 89 can change the pressure across the mass therein by increasing or decreasing the pressure in port 90 through conduit 90*a*.

If the system uses a static on-demand start-up system the oscillating of the piston therein will begin as air is introduced into the vibrator 82 without the use of port 90. If a dynamic on-demand start-up system is used dynamic system will generate the necessary pressure differential across the piston in the event the piston did not begin oscillating when the air was introduced into the vibrator 82. If dynamic on-demand start-up is used the oscillation of the mass within the vibrator will be driven by the momentary increase or decrease of pressure in the end chambers. That is, the momentary flow of air into or out of one of the end chambers in the vibrator 82 creates a pressure differential that causes the mass in the vibrator 82 to be displaced while the incoming gas in port 85 sustains the necessary oscillation of the mass therein. Once oscillation of the mass begins the end port 90 is closed to allow the oscillation to continue.

Thus in one embodiment the system comprises a non-impact linear vibrator having an integral on-demand static start-up system comprising a housing 11 having an internal bearing surface with an adhered lubricant therein and a fluid inlet port 30 to direct fluid into the chamber. A mass 35 having a set of fluid passages 41, 46, 40, 44 therein and an external bearing surface 35*c* located thereon to permit the mass 35 to slide back and forth in the chamber on a fluid bearing formed between the external bearing surface 35*c* and the internal bearing surface 19 to provide an on-demand static start-up system that inhibits or prevents atmospheric contamination. In another embodiment the system comprises a non-impact linear vibration having a dynamic on-demand start-up system or in still another embodiment the start-up system can include both a static on-demand start-up system and a dynamic on-demand start-up system.

I claim:

1. A non-impact vibrator comprising:

a housing having an internal bearing surface forming a chamber therein and a fluid inlet to direct fluid into the chamber;

a fluid port proximate an end of the chamber to momentarily change the differential pressure on a piston therein to thereby initiate displacement of the piston;

a mass having a set of fluid passages therein and an external bearing surface located thereon to permit the mass to slide back and forth in the chamber on a fluid bearing formed between the internal bearing surface and the external bearing surface; and an on-demand start-up system that inhibits or prevents atmospheric contamination.

2. The vibrator of claim 1 wherein the start-up system comprises an adhered lubricant carried by an anodized aluminum or an anodized aluminum alloy.

3. The vibrator of claim 2 wherein the adhered lubricant is polytetrafluoroethylene.

4. The vibrator of claim 3 wherein the polytetrafluoroethylene is impregnated in at least one of the bearing surface.

5. The vibrator of claim 4 including a pneumatic conveying tube having the vibrator secured thereto.

6. The vibrator of claim 5 wherein the vibrator is clamped to the pneumatic conveying tube.

7. The vibrator of claim 6 wherein an axis of oscillation of the piston is parallel to a flow axis of the pneumatic conveying tube.

8. The vibrator of claim 7 including a bracket that has one end clamped to the pneumatic conveying tube and the other end secured to the housing of the vibrator.

9. The vibrator of claim 1 wherein the on-demand start-up system comprises a dynamic start-up system that generates a pressure differential across the mass.

10. The vibrator of claim 1 including a static on-demand start-up system and a dynamic on-demand start-up system and the static on-demand system comprises and integral on-demand start-up system.

11. The vibrator of claim 1 wherein the dynamic on-demand start-up system includes a vacuum source connected to the fluid port proximate the end of the chamber.

12. The vibrator of claim 1 wherein dynamic on-demand start-up system includes a pressure source connected to the fluid port proximate the end of the chamber.

13. A non-impact vibrator comprising:

a housing having an internal bearing surface forming a chamber therein and a fluid inlet to direct fluid into the chamber;

a mass having a set of fluid passages therein and an external bearing surface located thereon to permit the mass to slide back and forth in the chamber on a fluid bearing formed between the internal bearing surface and the external bearing surface, at least one of the bearing surfaces comprises an anodized aluminum; and an on-demand start-up system comprising an adhered lubricant carried by the anodized aluminum that inhibits or prevents atmospheric contamination.

14. A non-impact vibrator comprising:

a housing having an internal bearing surface forming a chamber therein and a fluid inlet to direct fluid into the chamber;

a fluid port proximate an end of the chamber to momentarily change the differential pressure on a piston therein to thereby initiate displacement of the piston;

a vacuum source connected to the fluid port proximate the end of the chamber;

a pressure source connected to the fluid port proximate the end of the chamber;

a mass having a set of fluid passages therein and an external bearing surface located thereon to permit the mass to slide back and forth in the chamber on a fluid bearing formed between the internal bearing surface and the external bearing surface; and an on-demand start-up system that inhibits or prevents atmospheric contamination.

* * * * *